May 7, 1963   R. L. DAVIS   3,088,376
RING FOR IMPARTING SPIN
Filed March 26, 1962
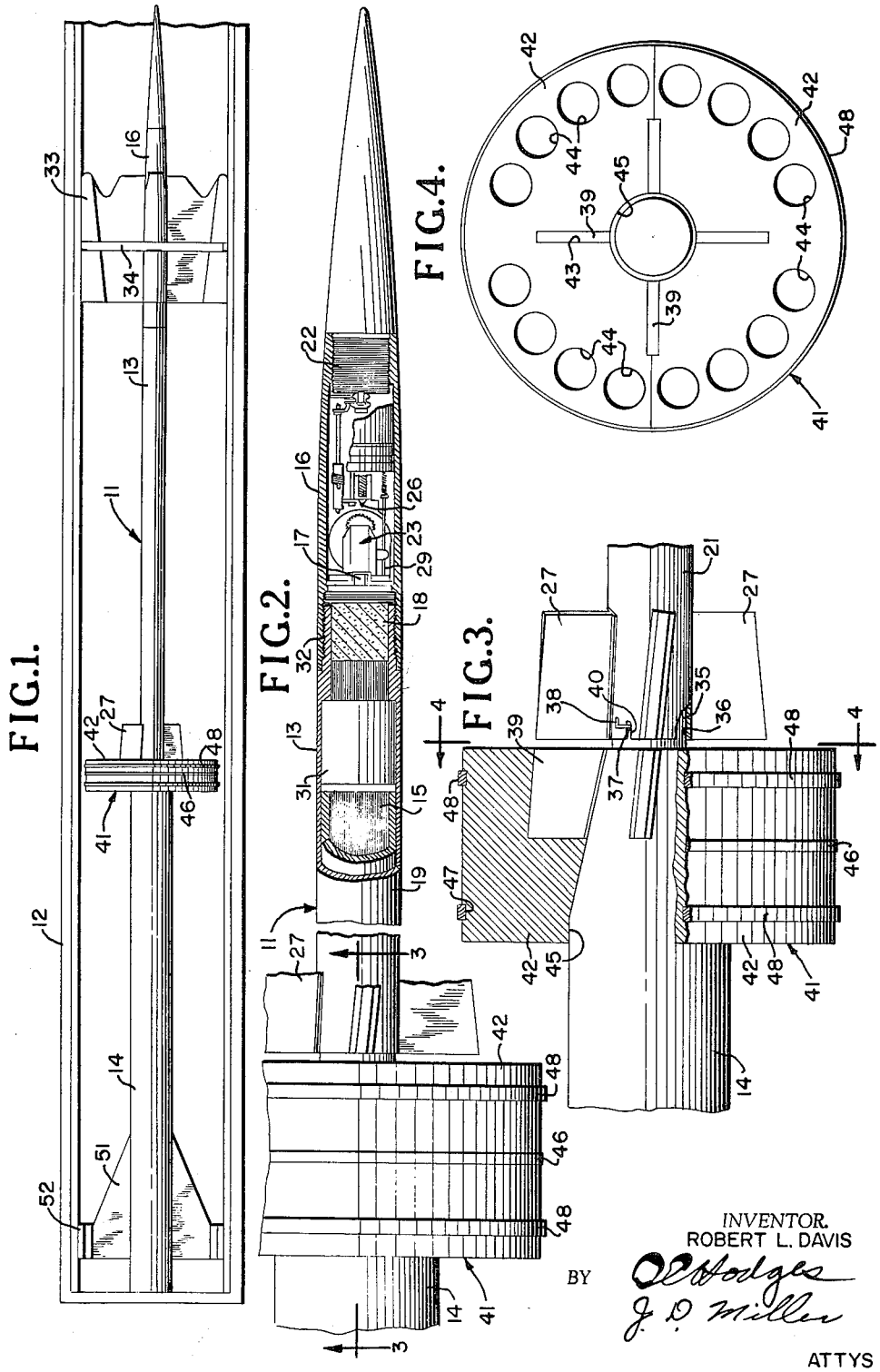
INVENTOR.
ROBERT L. DAVIS
BY  O. C. Hodges
    J. D. Miller
         ATTYS

United States Patent Office 3,088,376
Patented May 7, 1963

3,088,376
RING FOR IMPARTING SPIN
Robert L. Davis, Hyattsville, Md., assignor to the United States of America as represented by the Secretary of the Navy
Filed Mar. 26, 1962, Ser. No. 182,695
1 Claim. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

The present invention relates to the launching of a supersonic rocket and more specifically to a device that is attached to the supersonic rocket to impart a spin to the rocket as it is launched from a spiral grooved launching tube. In utilizing high flying jet aircraft and long range missiles it became imperative that information regarding winds at the higher altitudes be available. In an effort to satisfy this need for wind data various devices were developed to provide this needed information. The meteorological balloon did not satisfy this requirement because it had a limited altitude and because of difficult inflating and launching problems aboard ship.

It is the general purpose of this invention to provide a meteorological rocket that may be accurately launched from existing available equipment and the trajectory of the rocket may be correctly determined prior to firing. The rocket has a self-propelled reaction type motor that is capable of providing a driving force to the nose section that will carry it to altitudes in excess of 100,000 feet.

The rocket motor is of the type that will drop away shortly after burn out leaving the nose portion to travel along a trajectory path. The nose portion of the rocket will, at a predetermined altitude, eject a radar target device that may be accurately followed by radar to determine the direction and wind velocity.

An object of this invention is to provide a device that may be temporarily attached to a self-propelled missile for imparting spin on the missile as it is fired.

Another object is to provide a device that may be easily and temporarily attached to a rocket during loading of the rocket in the rifled launching tube and is capable of imparting a spin to the rocket as it is being launched.

Still another object is to provide a device for imparting spin to a meteorological rocket during launching but which will detach itself as soon as the rocket leaves the launcher.

A further object is to provide a device that may be attached to a self-propelled meterological rocket without special fastening devices on the rocket and which will automatically detach itself from the rocket upon leaving the launcher, leaving the rocket aerodynamically clean.

Further objects and the entire scope of the invention will become further apparent in the following detailed description and in the appended claims. The accompanying drawings display the general construction and operational principles of the invention; it is to be understood, however, that the drawings are furnished only by way of illustration and not in limitation thereof and wherein:

FIG. 1 illustrates a side elevation view of the meteorological rocket in the launching device in accordance with a preferred embodiment of the invention;

FIG. 2 illustrates a plan view, partly in section of FIG. 1;

FIG. 3 illustrates an enlarged view partly in section of the apparatus shown in FIG. 2 taken along line 3—3; and FIG. 4 illustrates an end view of the apparatus taken along line 4—4 in FIG. 3.

Referring now to the drawings which illustrate the preferred embodiment of the invention and, wherein, like reference numerals designate like parts throughout the several views, there is illustrated in FIG. 1 a self-propelled rocket 11 mounted in a launching tube 12. The launching tube may be any hollow cylinder having a uniform inside diameter of rifled configuration, such for example, as a gun barrel. The launcher may be placed at any angle, however, for best results an elevation angle of about 75° has been found to be satisfactory.

The rocket 11 as illustrated in FIG. 1 is composed of two sections, the first section 13 being the nose section and the second section 14 is the motor section. The motor section is inserted in the nose section substantially as shown in FIG. 3.

The nose section 13 of the rocket 11 as shown in FIG. 2 is a steel aerodynamic missile which is capable of separation from the motor section 14 during flight and carries a chaff pay load 15 to a predetermined height in the atmosphere. The nose section in FIG. 2 consists of three main elements; an ogive 16 containing a fuze 17, an expelling charge 18, a body assembly 19 housing the chaff 15 or other radar target, and a tail section 21.

The ogive 16 houses the mechanical time fuze 17 and the expelling charge 18 as shown in FIG. 2. The ogive tip forms the nose of the rocket 11 and may be removed from the ogive when setting the fuze. The mechanical fuze 17 initiates detonation of the expelling charge 18 after a predetermined period of time during flight. The mechanical fuze consists essentially of a timing mechanism 22, an arming mechanism 23, and an explosive element 24.

The timing mechanism 22 is a spring powered clock work, not shown, containing an escapement which will start running immediately after the arming mechanism 23 operates. A timing disc, not shown, has a scale graduated from 12 to 126 seconds, which permits selective setting by the fleet personnel for expulsion of chaff 15 at various desired altitudes. At the expiration of the preset time interval a spring loaded firing pin 26 is released and initiates firing for the expelling charge 18. The expelling charge consists of ten grams of black powder contained in a cup which is screwed into the end of the ogive. Initiation of the expelling charge in the body of the rocket head expells the chaff load 15. The chaff load may be any material that is easily detected by radar and sufficiently light in weight to travel at the wind velocity in which it has been ejected. For example, the chaff pay load may be thousands of small slivers of copper dipoles, small pieces of aluminum foil, or a metalized parachute target.

When the rocket is fired the inertial resistance force causes a setback weight in the arming mechanism 23 to rotate. This rotation aligns the firing pin 26, the primer and detonator, not shown but contained in firing mechanism 23, with expelling charge 18. This force also trips a safety switch 29 to start the timing mechanism 22. When the timing mechanism 22 runs a preset length of time, then the spring loaded firing pin 26 detonates the primer and the expelling charge 18. The explosive force created by the expelling charge ejects the chaff pay load 15 from the rocket head. This chaff pay load is picked up and tracked by radar to determine the course and velocity of the wind in which it is carried.

The rocket body shown in FIG. 2 contains the pay load 15 and a piston 31 which drives the pay load from the body 19. The body is substantially cylindrically shaped. A piston 31 is located in the forward end near the ogive and the remaining space in the body is taken up by the chaff pay load. The ogive may be mounted on the body assembly by any means well known in the art, for example, it may be screwed onto the threads 32 at the forward end of the body, as viewed in the drawing. The tail section 21 of the rocket nose gives aerodynamic stability to the nose section during its trajectory flight. The tail is made of an aluminum alloy with a plurality of canted fins 27 fitted on the aft end of the tail section, as viewed in the drawing. A plurality of bore riders 33 are mounted on the body of the nose section of the rocket in order to properly align the body while it is in the tube 12. A plastic retainer 34 fastens the bore riders to the body section until the rocket is launched. As the rocket leaves the launching tube, air drag causes the bore riders 33 to break their plastic retainer 34, if the rocket exhaust has not already burned it off in the barrel. Thus the nose section of the rocket is assured of proper alignment during the initial boost phase. The rocket motor is attached to the nose section of the rocket by a cylinder 35 which is inserted into a chamber 36 in the tail of the nose section. The motor sections have a bore 37 therethrough that may be aligned with an aligning slot 40 in the nose section for inserting an aluminum shear pin 38 therein as shown in FIG. 3. This allows the entire rocket to be handled as a unit while preparing the rocket for firing. Immediately upon being fired the rocket motor shears the aluminum pin so that it may be free to be disengaged immediately after motor burn out. Mounted on several fins 39 located on the front section of the motor is a device 41 capable of imparting initial spin to the rocket during the boost phase in the launching chamber. This device consists of two semi-circle sleeves 42 that are mounted around the forward end of the motor section. The sleeves are made of aluminum or other like material and have slots 43 milled therein in such manner that they engage and substantially enclose the canted fins 39 on the front of the motor section. A plurality of vent holes 44 are located around, and adjacent to, the exterior circumference of the device. These apertures form passageways for venting the hot gases of the motor section during the initial firing.

The fins 39 on the motor section are directly behind the fins on the nose section for reasons that will be hereinafter referred to. The forward fins 39 on the motor section may be bolted or welded on the motor as is well known in the art. The sleeves 42 completely enclose the forward portion of the rocket motor and completely encase the motor fins 39 located on the forward portion of the motor. The sleeves 42 are composed of two semi-circular pieces having a central aperture 45 that is substantially a frustum in shape. Near the outer edge of each semi-circle piece are a plurality of apertures 44 extending parallel to the longitudinal axis of the rocket motor for allowing the initial hot gases to escape up along the rocket motor and nose section during the initial firing of the rocket. The sleeve members are locked onto the motor section by an adhesive acetate 46 or plastic belt that may be easily ignited or broken. The two semi-circular sleeves have a pair of grooves 47 located on the outside circumference thereof for mounting two semi-circle bands 48 on each section of the sleeves in a manner well known in the art. Immediately upon firing, the hot gases and the inertial forces will break the acetate bands 46 holding the sleeves in place causing the semi-circular sleeve members to be wedged between the rocket motor 11 and the launching tube 12. The soft copper bands 48 mounted on the exterior of the sleeves 42 are forced to engage the grooves of the launching tube giving the entire rocket an initial spin of 15 to 18 r.p.m. during the boost phase from the launching tube. Immediately upon clearing the launching tube the sleeve members 42 will fall away due to the air drag and the lag of any additional holding means. The soft copper bands 48 cause the motor section and nose section to spin giving it initial axial stability during its flight.

The rear end of the motor section shown in FIG. 1 also has a plurality of fins 51 with bore riders 52 engaging only the lands of the launching tube to keep the rocket aligned during the initial boost phase from the launching tube. The fins 27 of the nose section and the fins 39 and 51 of both ends of the motor section keep the rocket spinning during flight.

The rocket motor is an internal, solid propellant rocket with an aluminum motor tube and a graphite exhaust nozzle. The motor tube contains a solid propellant pressure cast with a cross-shaped center void extending the full length of the tube.

In operation the motor is the component of the rocket which develops the thrust required for flight of the rocket nose. The bore riders at the base of the motor and the bore riders on the rocket nose, fit the rifled bore of the launcher closely enough to insure a planned flight path. The two-piece sleeve that fits over the converging nose of the rocket motor and the canted fins on both the motor section and nose section insure a spin of up to 70 r.p.m. to eliminate dispersion. Immediately upon firing of the motor the rocket is propelled forward in the launching tube, shearing the connecting pin which secures the motor to the nose portion. The mechanical time fuze within the rocket nose is started by this acceleration. The two piece sleeve on the tapered nose of the rocket is released causing the soft copper bands to engage the lands and grooves of the launching tube, thus effecting a slow spin of the entire rocket. Immediately after launching of the rocket the front and rear bore riders and the two piece sleeve fall away, leaving the rocket aerodynamically clean.

It has been found that a motor propellant capable of delivering an average of 3,340 pounds of thrust in approximately .8 second is able to provide sufficient energy to propel the nose section substantially over 107,000 feet into the atmosphere. The motor utilized in this device will impart a total impulse of approximately 2,660 pounds force/sec. during a boost stage. The peak acceleration of 230 gravational units will be developed in approximately 0.65 second after ignition. Burn out will occur at an altitude of approximately 1,500 feet.

Separation of the rocket head and the motor occurs at the instant of burn out. At this point the rocket nose is traveling at a rate of approximately 4,500 feet per second. Separation of the rocket head and motor at burn out is achieved under the influence of a differential drag, that is, a greater air resistance on the surface of the motor due to its large size, with the assistance of a spring loaded pin in the nose of the motor, not shown.

After separation, the rocket head continues to travel due to the kinetic energy acquired during the boost stage. At a predetermined altitude, between about 30,000 and 107,000 feet when launched at an elevation angle of 75°, operation of the preset fuze ejects the chaff target into the atmosphere. The chaff when released at an altitude of 100,000 feet disperses and falls at a rate of approximately 90 feet per second.

Obviously many modifications and variations of the present invention are possible in light of the above teachings.

It is therefore to be understood, that within the scope of the appended claim, the invention may be practiced otherwise than as specifically described.

What is claimed is:

A device for imparting spin to a fin stabilized rocket launched from a rifled gun barrel comprising a hollow split sleeve formed of a pair of semicircular members provided with a plurality of slots for accommodating fins secured to said rocket whereby rotation of said split sleeve will result in rotation of said rocket, at least one soft metal band partially embedded in the outer surface of each semicircular member and projecting radially, said bands being disposed in corresponding positions on each semicircular member and defining a closed loop when said members are in abutting relationship, and a frangible band for holding said semicircular members in abutting relationship and in engagement with said rocket and said fins, the interior surfaces of said semicircular members defining a frustum complementary to a rearwardly flared section of said rocket whereby rapid acceleration of said rocket will rupture said frangible band and the rearwardly flared section will cam said semicircular members radially outward to force portions of the soft metal bands into the rifling grooves of the gun.

References Cited in the file of this patent

UNITED STATES PATENTS

| | | |
|---|---|---|
| 2,715,874 | Hablutzel et al. | Aug. 23, 1955 |
| 2,856,856 | Michael | Oct. 21, 1958 |
| 3,023,703 | Beatty | Mar. 6, 1962 |
| 3,038,382 | Noyes et al. | June 12, 1962 |